United States Patent Office 3,229,350
Patented Jan. 18, 1966

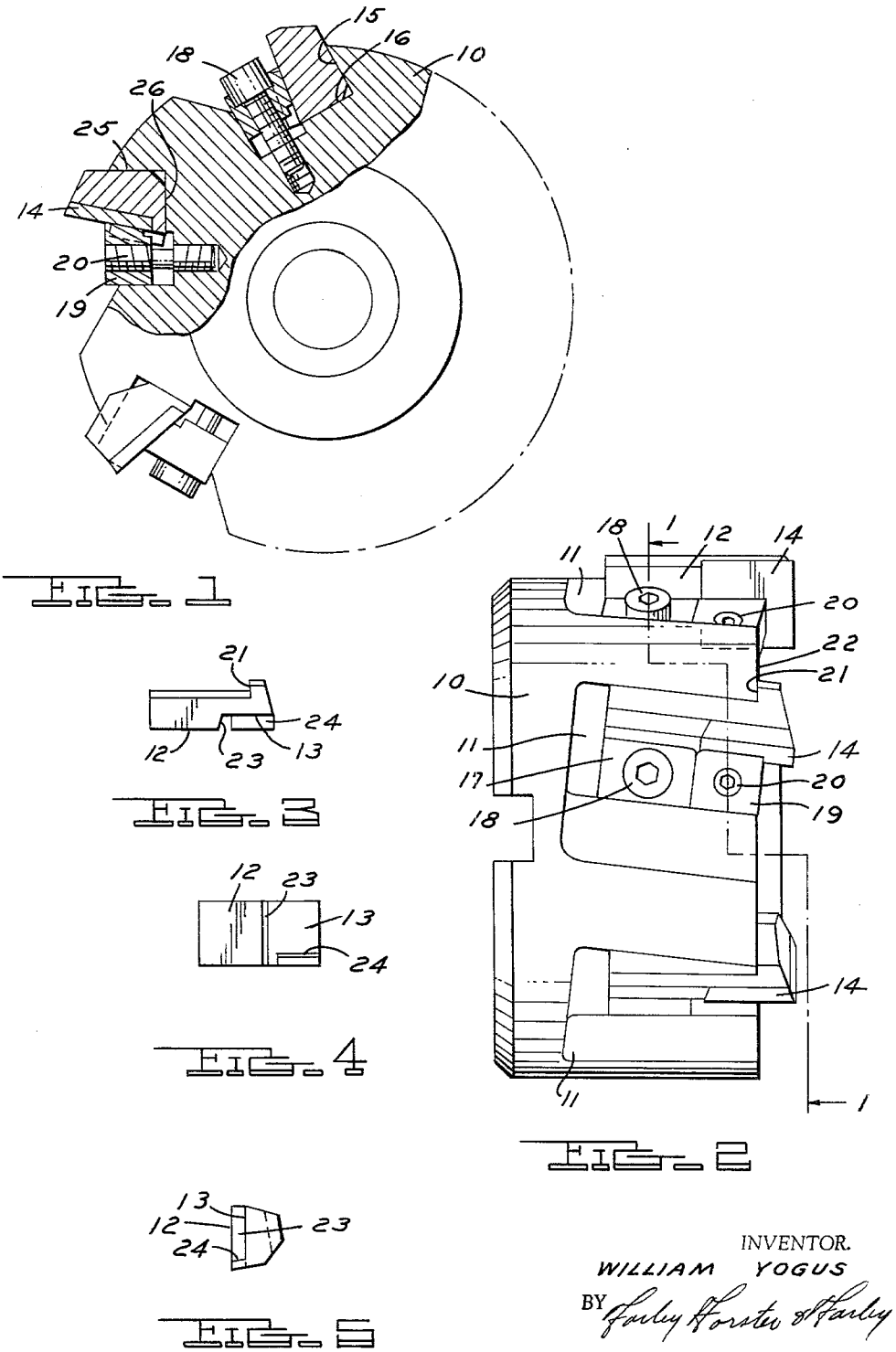

3,229,350
REPLACEABLE CUTTER TOOL CONSTRUCTION
William Yogus, Birmingham, Mich., assignor to The Valeron Corporation, Detroit, Mich., a corporation of Michigan
Filed Jan. 13, 1964, Ser. No. 337,244
2 Claims. (Cl. 29—105)

This invention relates to an improved cutting tool construction and more particularly to a cutting tool such as a milling cutter or boring tool having replaceable cutter cartridges preferably for indexable cutter elements.

Existing practice in cutting tools of the indexable insert style, whether the insert is contained in a cartridge enclosure, or seated on an anvil or in a machined slot in the cutter body, depends upon some form of adjustment to eliminate face run-out or to control face run-out within predetermined limits. In the present improved cutting tool construction each removable cartridge or anvil is provided with a front locating shoulder which engages a ground surface on the front of the cutter body so that all cartridge elements and indexable cutter blades held therein may be precisely located relative to a common accurately ground surface of the cutter body normal to the axis of rotation. This feature and other objects of the invention may best be understood from the following detailed description of a preferred embodiment and modification thereof with reference to the drawings wherein:

FIGURE 1 is a front elevation of a milling cutter partially sectioned along the line 1—1 of FIGURE 2;

FIGURE 2 is a side elevation of the milling cutter;

FIGURE 3 is a radial view of one of the anvil elements;

FIGURE 4 is a circumferential view of such element;

FIGURE 5 is a front or axial view of such element.

Referring to FIGURES 1–5, an annular cutter body 10 has a plurality of slots 11 formed in its outer perimeter each housing an anvil 12 having a pocket 13 for an indexable insert cutter element 14, the anvil being held against slot surfaces 15 and 16 of the cutter body by wedge clamp 17 and cap screw 18. The cutter element is held in the pocket of the anvil by a separate wedge clamp 19 and differential screw 20. A shoulder 21 of each anvil registers against an accurately ground face 22 of the cutter body extending in a plane normal to the axis of rotation so that the axial position of the anvil and cutter element seated therein may be accurately established without any need for adjustment.

The pocket 13 for each indexable insert has a circumferentially extending shoulder 23 tapered to match the angle of the cutter element and an axially extending shoulder 24, likewise tapered to match an adjacent tapered surface of the cutter element. Corner surfaces 25 and 26 of the anvil, as well as the mating surfaces 15, 16 in the cutter body, are preferably ground for accurate seating in order to insure proper registration of the shoulder surface 21 with the face of the cutter body.

In producing a set of anvils for a cutter body, a master plate is preferably employed against which the anvil shoulders 23 locate while finish grinding the back shoulders 23 for the cutter inserts of the complete set of anvils so that uniformity of dimensional relationship between the shoulders 21 and 23 is assured. In assembling the anvils to the cutter body each shoulder 21 is held in firm registration with the face 22 while the wedge lock 17 is applied and the screw 18 is tightened. An indexable cutter element is then inserted in the pocket of the anvil with edge faces held in firm registration with shoulders 23 and 24 while the wedge clamp 19 is tightened.

It will be apparent that each indexable cutter element may be unclamped and rotated to a new position without loosening the anvil, and that precision tolerances in the manufacture of the cutter elements will assure elimination or accurate control of face run-out for the various cutting edges of the cutter element 14. Four positions of indexing are provided for each cutter element where the edges are tapered as shown for positive rake. However, it will be understood that for some applications the cutter may be designed for negative rake employing cutting elements having square edges with the negative rake angle provided in the anvil, in which case the cutting elements may be turned over as well as rotated providing eight positions of adjustment.

While one embodiment of the invention applied to a shell milling cutter has been shown and described in detail, it will be understood that other applications of the invention to rotary cutting tools are possible, and that numerous modifications might be resorted to without departing from the scope of the invention as defined in the following claims.

I claim:

1. A milling cutter comprising an annular rotatable cutter body, a continuous true face surface on said body extending in a plane normal to the axis of rotation, a plurality of slots in the periphery of said body for housing a corresponding plurality of cutting element locating units, each of said locating units comprising an anvil housed within one of said slots, a radially inwardly extending shoulder on each anvil for engaging said true face surface, said anvil having a radially outwardly extending shoulder for locating one of a plurality of symmetrical surfaces of an indexable cutter element, said anvil having a second radially outwardly extending shoulder adapted to engage a second of said symmetrical surfaces of said indexable cutter element, an indexable cutter element having a pair of symmetrical surfaces engaging said respective radially outwardly extending shoulders, and means for clamping said indexable cutter element to said anvil and said anvil to said cutter body in assembled relation comprising side by side wedge locks adapted to react on one side against a common wall of said slot and on the other side against respective surfaces of said anvil and said cutting element.

2. A milling cutter as set forth in claim 1 wherein a single surface of said anvil is adapted to register against the other side wall of said slot.

References Cited by the Examiner
UNITED STATES PATENTS
2,664,617    1/1954    Kralowetz _____ 29—105

FOREIGN PATENTS
1,047,059    7/1953    France.
1,059,290    11/1953   France.
826,537      1/1952    Germany.
367,694      4/1963    Switzerland.

WILLIAN W. DYER, JR., *Primary Examiner.*
H. L. HINSON, *Assistant Examiner.*